US006518349B1

(12) United States Patent
Felix et al.

(10) Patent No.: US 6,518,349 B1
(45) Date of Patent: Feb. 11, 2003

(54) SPRAYABLE POWDER OF NON-FIBRILLATABLE FLUOROPOLYMER

(75) Inventors: Vinci Martinez Felix, Kennett Square, PA (US); Peter L. Huesmann, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/538,363

(22) Filed: Mar. 29, 2000

Related U.S. Application Data

(60) Provisional application No. 60/127,112, filed on Mar. 31, 1999, and provisional application No. 60/154,742, filed on Sep. 17, 1999.

(51) Int. Cl.[7] ................................................. C08K 3/34
(52) U.S. Cl. ...................... 524/492; 524/430; 524/444; 524/446; 524/449; 524/501; 524/502; 523/206
(58) Field of Search ................................ 524/449, 492, 524/444, 446, 430, 520, 501, 502; 523/206; 528/498, 499; 526/242, 250, 253, 255

(56) References Cited

U.S. PATENT DOCUMENTS

| | | | |
|---|---|---|---|
| 3,265,679 A | | 8/1966 | Black et al. ................ 260/92.1 |
| 3,953,412 A | | 4/1976 | Saito et al. ................. 526/247 |
| 3,956,000 A | | 5/1976 | Kuhls et al. ................ 106/270 |
| 4,143,110 A | * | 3/1979 | Morozumi et al. ......... 264/117 |
| 4,241,137 A | * | 12/1980 | Izumo et al. ............... 428/402 |
| 4,774,304 A | * | 9/1988 | Kuhls et al. .................. 526/24 |
| 4,914,158 A | * | 4/1990 | Yoshiumra et al. ......... 525/199 |
| 5,093,403 A | | 3/1992 | Rau et al. ................... 524/404 |
| 5,879,804 A | * | 3/1999 | Tsubuku .................... 428/402 |
| 5,968,642 A | * | 10/1999 | Saito ........................ 428/304.4 |
| 5,972,494 A | * | 10/1999 | Janssens .................... 428/324 |
| 6,025,441 A | | 2/2000 | Koshirai et al. ............ 525/199 |
| 6,063,855 A | * | 5/2000 | Pecsok et al. .............. 524/520 |
| 6,232,372 B1 | * | 5/2001 | Brothers et al. ............ 523/206 |

FOREIGN PATENT DOCUMENTS

| | | | |
|---|---|---|---|
| CA | 1 248 292 | 1/1989 | ......... C08F/214/24 |
| EP | 0 896 017 A1 | 2/1999 | .............. C08J/3/12 |
| RU | 2050379 | 12/1995 | .............. C08J/3/00 |
| WO | WO 00/58389 | * 10/2000 | |

* cited by examiner

Primary Examiner—Edward J. Cain

(57) ABSTRACT

The invention provides for sprayable powder comprising friable granules of agglomerated primary particles of non-fibrillatable fluoropolymer and, optionally, at least one other component, the powder having a bulk density of at least 20 g/100 cc and average particle size of 5 to 100 micrometers. The sprayable powder is preferably free of water immiscible liquid, and more preferably free of halocarbon liquid. Included among the other components are inorganic fillers, pigments, high temperature resistant polymer binders. In another embodiment, the invention provides for a sprayable powder comprising friable granules of agglomerated primary particles of a first non-fibrillatable fluoropolymer and at least one other non-fibrillatable component. The invention further provides for a process for preparing the sprayable powder by spray drying a liquid dispersion. In a preferred embodiment, the process includes densifying the granules of agglomerated primary particles that result from spray drying. Densifying may be carried out by mechanical compaction or by contacting the granules with a heated gas to form a fluidized bed. Optional steps of comminution and heat treatment may be employed to achieve a desired bulk density and particle size for specific applications.

40 Claims, 5 Drawing Sheets

SPRAYABLE POWDER OF NON-FIBRILLATABLE FLUOROPOLYMER

RELATED APPLICATION

This application claims the benefit of Provisional Applications Nos. 60/127,112 filed Mar. 31, 1999 and Ser. No. 60/154,742 filed Sep. 17, 1999.

FIELD OF THE INVENTION

This invention relates to non-fibrillatable fluoropolymers and more particularly, to sprayable powders thereof.

BACKGROUND OF THE INVENTION

Fluoropolymer resin having properties such as good chemical resistance, excellent release, good heat resistance and electrical insulation are desirable in a number of applications. Fluoropolymer powders which are melt-flowable have been found useful in coating cookware articles such as fry pans, sauce pans, rice cookers, grills, and bakeware as well as numerous industrial applications such as fuser rolls or belts for copiers and printers, and chemical processing reactors. One of the advantages for applying powder coatings in lieu of liquid coatings is the absence of volatile organic solvents that present environmental concerns and necessitate expensive remediation procedures.

Canadian patent 1,248,292 (Buckmaster et al.) discloses a conventional process for preparation of the dry powder, in which the aqueous polymerization dispersion of the fluoropolymer is chemically treated with a gelling agent while being agitated and then treated with a water immiscible organic liquid (usually a halocarbon). This treatment causes the primary fluoropolymer particles, generally of average particle-size of 0.1 to 0.5 micrometers, to coagulate (agglomerate) into granules generally having an average particle size of 200 to 3000 micrometers over a lengthy period of agitation. This process is generally known as "solvent-aided coagulation". To render the granules essentially non-friable, they are heat-hardened at temperatures close to the melting temperature of the fluoropolymer.

While the resultant granules are valuable for use in such processes as rotocasting and rotolining, they are less useful for coating applications. The granules are too large to make uniform coatings. To be useful, the granules are comminuted to smaller particle sizes, which increases cost and tends to fibrillate the heat hardened granules and thereby cause plugging of spraying equipment used for applying the coating. Comminution of non-heat hardened granules produces excessive fines (particles less than 1 micrometer) which have poor handling and coating characteristics.

Another method for producing fluoropolymer powder is disclosed in U.S. Pat. No. 3,953,412 (Saito). This reference discloses that an aqueous dispersion of tetrafluoroethylene polymer is atomized into a gas at a temperature above the melting point of tetrafluoroethylene polymer, whereby the dispersed solids are coalesced and sintered to produce sintered micro-powder with an average particle size of 100 microns or less. Sintered spherical particles of the Saito invention are described as useful as lubricants and for molding applications. These nearly spherical particles are suited for processing by rotomolding or casting. But because these particles have been sintered (that is heat hardened at temperatures close to the melting point of the polymer) it is difficult to further tailor the particle size, such as by grinding, to produce particles for certain spraying applications, as the particles are essentially non-friable.

Attempts have been made to produce blended fluoropolymer powder coatings with multiple components, such as fluoropolymer blended with polymer binder discussed in U.S. Pat. No. 5,093,403 (Rau et al.). In '403, the particle dimensions of the formulation components are determined by grinding or milling capabilities and limit the composition uniformity of coatings fabricated from the blend. Such blends also exhibit segregation in shipping, processing and recovery of used powder. When using a powder mixture for electrostatic spraying, the components of the mixture tend to segregate. The segregation can produce a variable powder coating composition when the powder is sprayed on a substrate. Another notable problem occurs in electrostatic spray coating in conjunction with the sprayed powder that does not adhere to the target substrate, known as "overspray". Segregation in the overspray prevents direct recycle to the spraying operation.

There remains a need for a uniform composition of sprayable powder of non-fibrillatable fluoropolymer optionally blended with other components that can be produced, in the absence of a processing step involving halocarbon solvents and/or without the necessity of sintering the particles.

SUMMARY OF THE INVENTION

In a first embodiment, this invention provides for sprayable powder comprising friable granules of agglomerated primary particles of non-fibrillatable fluoropolymer and at least one other component, the powder having a bulk density of at least 20 g/100 cc and average particle size of 5 to 100 micrometers. The sprayable powder is preferably free of water immiscible liquid, and more preferably free of halocarbon liquid. Included among the other components are inorganic fillers, pigments, high temperature resistant polymer binders.

In another embodiment, the invention provides for a sprayable powder comprising friable granules of agglomerated primary particles of a first non-fibrillatable fluoropolymer and at least one other non-fibrillatable fluoropolymer component.

The invention further provides for a process for preparing the sprayable powder by spray drying a liquid dispersion of primary particles of non-fibrillatable fluoropolymer and at least one other component to obtain friable granules. The dispersion is preferably free of water immiscible liquid and more preferably free of halocarbon liquid. In a preferred embodiment, the process includes preparing sprayable powder of non-fibrillatable fluoropolymer and, optionally, at least one other component, and densifying the granules of agglomerated primary particles that result from spray drying. Densifying may be carried out by mechanical compaction or by contacting the granules with a heated gas to form a fluidized bed. Optional steps of comminution and heat treatment may be employed to achieve a desired bulk density and particle size for specific applications.

Another embodiment of the invention provides for sprayable powder of non-fibrillatable fluoropolymer comprising a uniform, non-segregatable mixture of friable granules of agglomerated primary particles of the fluoropolymer and at least one other component wherein the powders are melt-processible.

The objects of the present invention may be obtained without sintering of the particles or the use of halocarbon solvents.

DETAILED DESCRIPTION OF THE INVENTION

Figure 1:
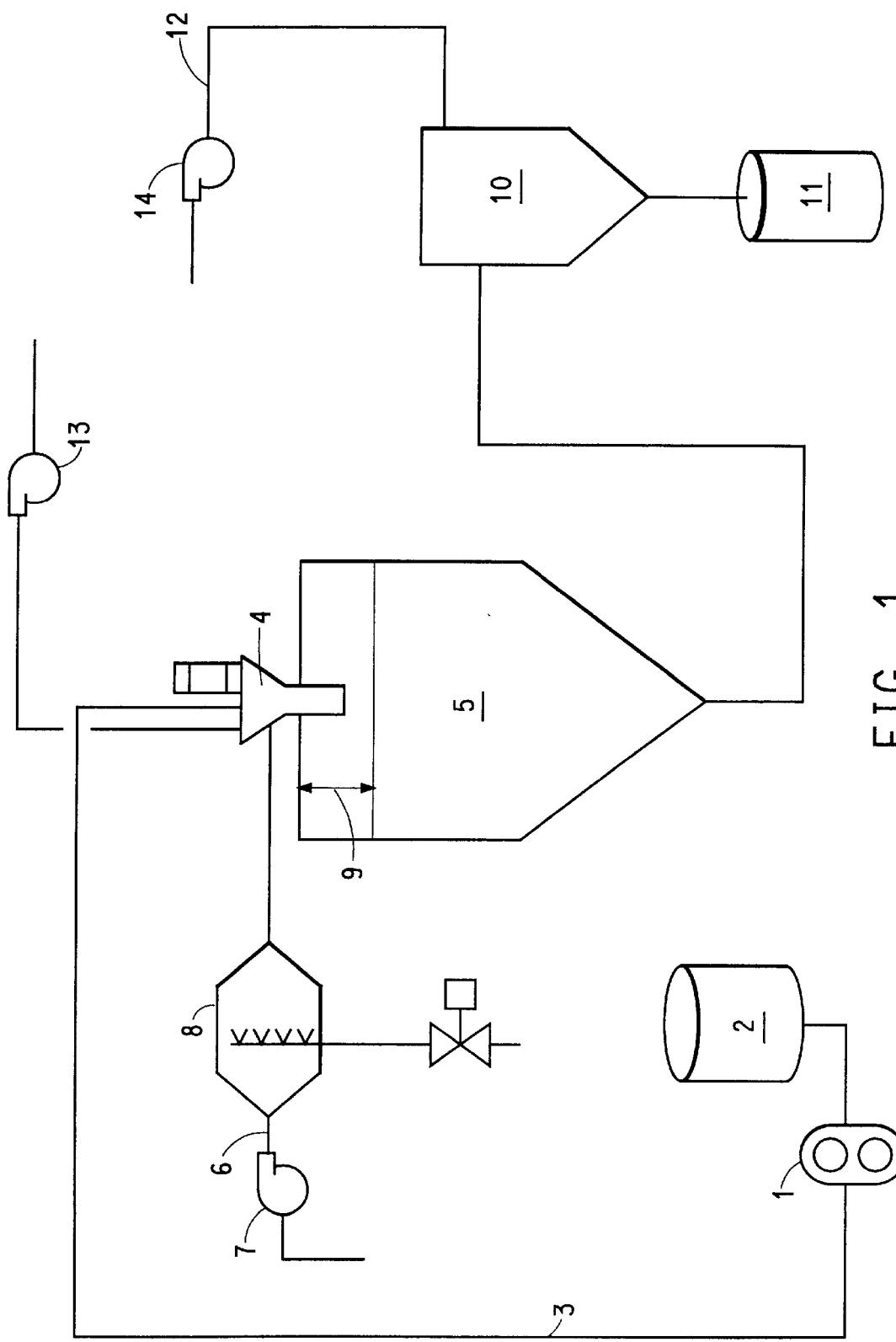
FIG. 1 is a schematic of a spray drying system for producing sprayable powders of this invention from liquid dispersion, specifically an aqueous embodiment.

Sprayable powder of this invention is prepared by spray drying a liquid dispersion of non-fibrillatable fluoropolymer and, optionally, at least one other component, optionally followed by densifying the resultant granules of agglomerated primary particles to obtain friable granules of the fluoropolymer which have a bulk density of at least 20 g/100 cc and an average particle size of 5 to 100 micrometers.

By "friable" is meant that the granules can be reduced to a smaller particle size (comminuted) without causing appreciable particle deformation such as the formation of fibrils extending from the ground particles. The friable granules of this invention have an irregular particle shape.

For simplicity, the granules are sometimes referred to herein as powder. The granules are friable because the temperature used. in the spray drying step is less than the melting temperature of the fluoropolymer, preferably at least 25 degrees C. below the melting temperature. If the temperature were above the fluoropolymer melting temperature, the granules would be fused or sintered (that is heat hardened at temperatures close to the melting point of the polymer) and thereby difficult to further tailor the particle size, such as by grinding, to produce particles for certain spraying applications. Therefore, the powders of the present invention may be characterized as non-sintered powders. The sintering or fusing used in prior art processes produces particles having a spherical shape, whereas the powder granules of the present invention have irregular shapes.

The densifying step carried out sequentially after the spray drying step enhances the ability of the granules to be useful as sprayable powder for some applications, such as in a light bulb coating application in which only a thin fused fluoropolymer coating, e.g. less than 50 micrometers, is desired. By "densifying" is meant the increase in bulk density of the spray dried powders. For some applications, such as coating light bulbs, densifying is desirable in order to provide a fused thin, bubble-free, continuous coating. In particular, the exterior of light bulbs are coated with a thin film of melt-flowable fluoropolymer to protect the surroundings from shards of glass should the bulb break, such as can occur in the use of heat lamps to keep cooked food hot in food serving facilities. A fluoropolymer powder is sprayed onto the exterior surface of a bulb, followed by heating the resultant powder coating to fuse it into a continuous, thin, transparent fluoropolymer coating. In other applications, such as when sprayable powders are used as primer coats or used for coating very small containers or parts, further densifying after spray drying may be not be needed.

Thus, the present invention provides an advantageous short-cut to sprayable powder of non-fibrillatable fluoropolymer, without the need for solvent-aided coagulation as described in Canadian patent 1,248,292, and without heat hardening at temperatures near the melting point of the polymer and subsequent comminution of the heat hardened granules. By eliminating solvent-aided coagulation, there is no need to employ gelling agents and water immiscible liquids including halocarbon, and thus there is also no need for expensive halocarbon recovery schemes to protect the environment. Some comminution of the powder obtained by the present invention, however, may be desirable, e.g. to produce powder of an average particle size of 5 to 50 micrometers, but this is much less severe comminution than required for heat-hardened granules and occurs without the formation of excessive fines and without fibrillation of the granules forming the powder. Surprisingly, the sprayed coating from the powder provides improved transparency, thereby improving both the appearance of coated articles such as a light bulb and its illumination/heating function. The sprayable powders of this invention also surprisingly provide the ability to form thicker coatings with higher builds than conventional sprayable powders.

The product of the present invention can be described as sprayable powder comprising friable granules of agglomerated primary particles of non-fibrillatable fluoropolymer and, optionally, at least one other component, the powder having an average particle size of 5 to 100 micrometers, preferably 10 to 80 micrometers, and a bulk density of at least 20 g/100 cc, preferably at least 35 g/100 cc, more .preferably at least 55 g/100 cc and most preferably at least 75 g/100 cc. In another embodiment, the invention provides for a sprayable powder comprising friable granules of agglomerated primary particles of a first non-fibrillatable fluoropolymer and at least one other non-fibrillatable fluoropolymer component. The sprayable powder of this invention is-preferably-free of water immiscible liquids, including being free of halocarbon and it is also free of gelling agents. The powder may also be uncomminuted if controlled by the spray drying/densification process to achieve the particle size desired.

By using this invention, sprayable powder of non-fibrillatable fluoropolymer having friable granules of agglomerated primary particles of fluoropolymer combined with other components are easily produced. Sprayable powders having multiple components are prepared by adding components such as fillers, pigments and other additives to the liquid dispersion of fluoropolymer and spray drying, with optional steps of densification, heat treatment and comminution as described above. Sprayable powders of this invention formed with multiple components produce more uniformly blended products which components tend not to segregate upon application as compared to products formed from dry blending processes or conventional coagulation of multicomponent dispersions (e.g., mechanical coagulation and solvent-aided coagulation). The components of the sprayable powder are intimately enmeshed and the tendency of the components not to separate upon application. as a coating is referred to as non-segregatable. The uniformly blended sprayable powder of this invention also tends not, to segregate in shipping, processing and recovery of scrap powder and provides a more uniform coating upon electrostatic spraying.

Likewise the sprayable powder may be composed of friable granules of a plurality of fluoropolymers wherein additional fluoropolymers are added to the liquid fluoropolymer dispersion or multiple dispersions of different fluoropolymers are mixed prior to spraying. Alternately, multiple feeds of a plurality of fluoropolymer dispersions may be pumped to the drying chamber and spray dried such that friable granules of a plurality of fluoropolymers are formed as the particles agglomerate in the drying chamber. Blends of polymers and components formed by using this invention are more uniform than those formed by conventional mechanical methods of blending powders of individual components after powder formation.

One especially useful blend that may be prepared by using the teachings of this invention is a uniform blend of fluoropolymer and high temperature resistant polymer binder. The sprayable powder formed from this combination of components is useful as a primer layer on metal substrates, priming the surface for the application of additional layers of fluoropolymer coatings.

The present invention also facilitates the step of fusing the powder-sprayed coating onto the substrate, such as a light bulb, by enabling the melt flow characteristic needed for particular substrates to be customized. For example, commercially available low melt-flow, medium melt-flow and high-melt flow fluoropolymers can be combined as liquid dispersions with application of the spray drying/densifying operation of this invention to provide sprayable powder of a plurality of melt-flowable fluoropolymers providing the melt flow desired. In this case, the granules of agglomerated primary particles are a mixture of primary particles of different melt-flowable fluoropolymers. The difference between the plurality of fluoropolymers making up the powder can be simply a difference in melt flow and/or a difference in chemical identity, i.e. different monomers are used to make one of the fluoropolymers.

Sprayable powder of this invention has a characteristic specific surface area (SSA) of from 1–6 $m^2/g$. As polymerized, raw dispersion particles have an SSA of from 10–12 $m^2/g$. As the particles coalesce, the SSA decreases. The SSA of the sprayable powder of this invention is an indication that upon further processing, such as grinding, the particles will neither melt nor produce undesirable fines. The SSA of conventional heat hardened or sintered particles (those heat hardened at temperatures near the melting point of the polymer), such as those produced according to U.S. Pat. No. 3,953,412, is less than 1 $m^2/g$ and such particles tend to fibrillate and cause plugging of spraying equipment.

Figure 4A:
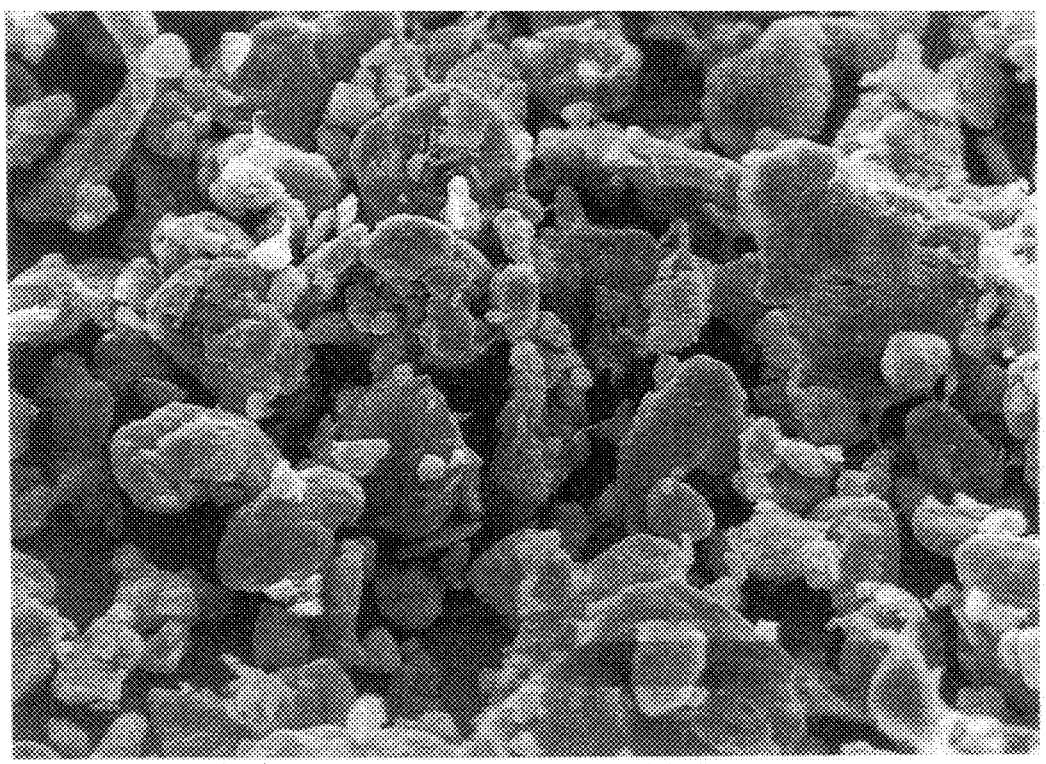
FIGS. 4a and 4b are scanning electron micrographs at 500X and 100X magnification, respectively, of sprayable fluoropolymers of this invention.
Figure 4B:
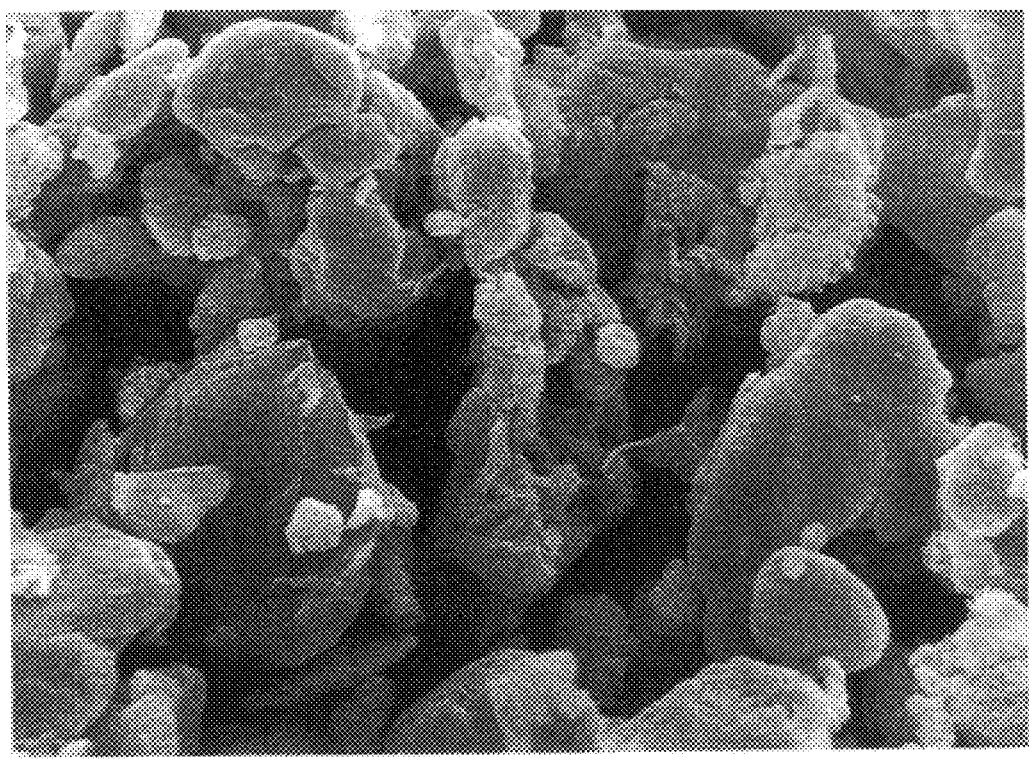

Friability of the inventive granules is best illustrated by FIGS. 4a and 4b that are scanning electron micrographs showing sprayable powders of the present invention. The particles appear more porous than conventional heat hardened particles and are more easily densified without producing fibrils or excessive fines. Powders of this invention have less than 10% fines.

Referring to FIG. 1, there is schematically shown a system for producing sprayable powders of this invention from liquid dispersion. The liquid dispersion has a total solids content of at least 5 weight %, preferably from 5–70 weight %, more preferably from 10–50 weight % and most preferably from 15–45 weight %. Spray drying is accomplished by atomizing liquid feed into a drying chamber breaking the liquid into a multiplicity of droplets by centrifugal effect and subjecting the droplets to stream of heated gas to produce powder particles. Specifically, in this first embodiment, an aqueous dispersion of primary particles of non-fibrillatable fluoropolymer dispersion and, optionally, at least one other component is pumped by a low shear feed pump 1 from feed tank 2 through pipe 3 to rotating centrifugal atomizer 4 (cooled by cooling fan 13) located at the top of the spray dryer chamber 5. Air is supplied to chamber 5 by transporting air through pipe 6 with the aid of supply fan 7 and heating the air by direct fired gas burner 8. The heated air serves as a drying gas creating a hot air envelope 9, in a top fraction (approximately the upper tenth) of chamber 5. The temperature of the heated air introduced into the chamber is in the range of from 840° F. (449° C.) to 860° F. (460° C.) and the hot air envelope has an average temperature of 850° F. (454° C.). The aqueous dispersion passes through centrifugal atomizer 4 into the hot air envelope 9 where the water is rapidly vaporized and the primary particles begin to agglomerate into a larger particle size. As the particles descend downwardly through chamber 5, they grow and are exposed to decreasing temperatures moving with a gas stream of evaporating water and air until powder particles exit the chamber where the temperature is in the range of from 220° F. (104° C.) to 300° F. (149° C.). During this process, the particles are not exposed to the high inlet temperature for a period of time sufficient to cause sintering of the polymers. Likewise, the temperatures in the lower portions of the spray-drying apparatus are insufficient to cause sintering of the polymers in the particles. Powder particles are separated from the gas stream in baghouse 10 and collected in powder container 11. The gas stream of air and water vapor passes through baghouse 10, and is vented to the atmosphere through stack pipe 12 with the aid of exhaust fan 14. Because the sprayable powder of this invention is produced without solvent-aided coagulation of the primary particles as described in Canadian patent 1,248,292 (Buckmaster et al.), the powder particles are free of halocarbon liquid and free of gelling agent.

Alternately, the dispersion of primary particles of non-fibrillatable fluoropolymer fed to the drying chamber may include a water miscible organic solvent as the liquid component instead of or in addition to water. Suitable organic solvents include N-methyl pyrrolidone and methyl isobutyl ketone among others. The organic solvent is not a halocarbon liquid. If an organic solvent is used as the liquid, hot nitrogen gas in the range of 900 to 1000 kg/hr at a feed rate ratio of nitrogen to organic solvent dispersion of about 15–35:1 is introduced into the chamber as a drying gas to create a hot gas envelope having a temperature of from 554° F. (290° C.) to 572° F. (300° C.). However, the exposure time of the particles to the high drying gas temperatures is insufficient to cause sintering of the polymers. Powder particles are separated from the gas stream in a baghouse as described above. However, the nitrogen gas and the organic solvent are passed through a condenser (not shown) where the solvent is recovered and processed separately and the solvent free nitrogen gas is recovered and recycled in the spray drying system in a closed loop system.

Figure 2:
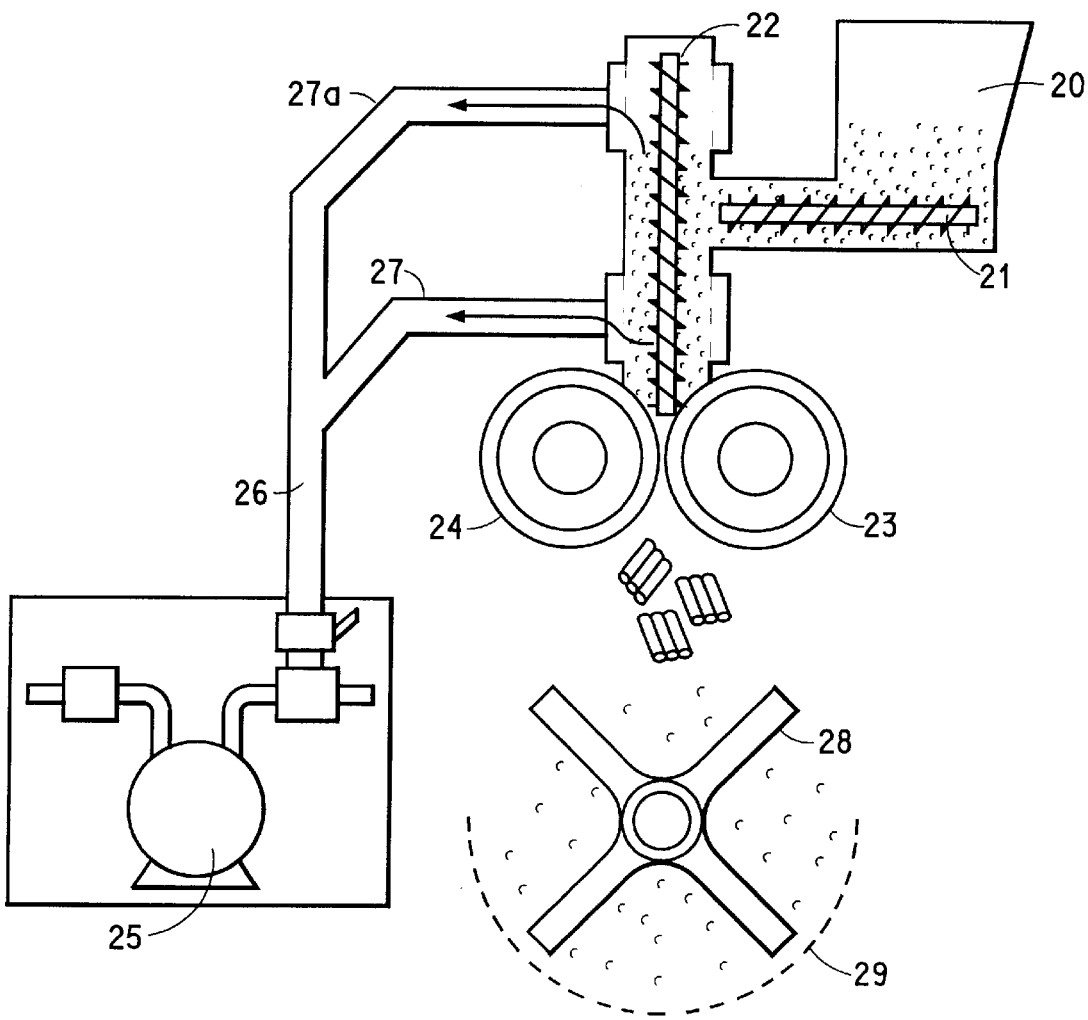
FIG. 2 is a schematic of a densification system applied to spray dried powders to produce sprayable powders of this invention.

In the preferred embodiment of this invention, powder particles are further densified after spray drying. Such further densification is desirable if powder particles exiting the spray dryer have a density that is lower than desired for a particular application. One means to accomplish densification is schematically shown in FIG. 2. Powder particles that have been formed by the spray drying process described above are placed in feed hopper 20 and are fed by horizontal feed screw 21 to a mechanical compaction process. Powder particles pass from horizontal feed screw 21 to vertical feed screw 22 which, with the aid of a vacuum deaeration system, feeds the powder between compaction rollers 23, 24. The deaeration system is illustrated by vacuum pump 25 and suction hose 26 having two receiving sections 27, 27a from vertical screw 22. The compaction rolls are equipped with interlocking grooves or fingers (not shown) which subject the powder to mechanical pressure in the ranges of 650–1500 psig (4.5–10.3 MPa), preferably from 1000–1100 psig (6.9–7.6 MPa) causing the powder to pelletize. Polymer pellets exiting the compaction rolls are subjected to a rotary cutter blade 28 and passed through sizing mill screen 29 to mechanically separate sprayable powder of non-fibrillatable polymer of friable granules of agglomerated primary particles of a desired size. Depending on the selection of cutter blade and mill screen, the polymer particles may require an additional grinding step to achieve a particle size suitable for particular applications as will be described below.

Figure 3:
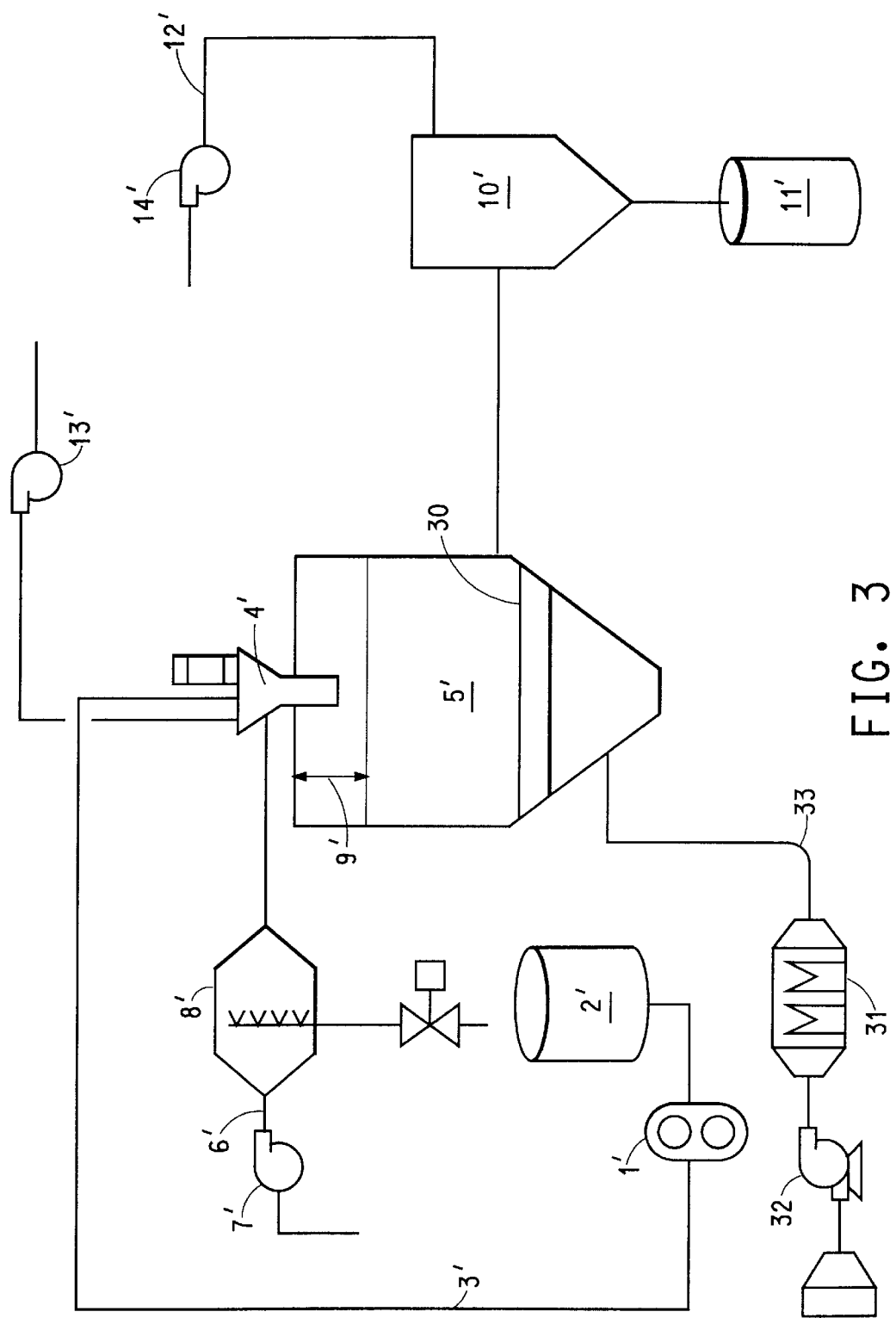
FIG. 3 is a schematic of a continuous spray drying/densification system for producing sprayable powders of this invention from liquid dispersion.

In another embodiment, the spray drying step and the densifying step are carried out in corresponding zones in gravity communication with one another, wherein the spray dried particles fall into the densifying zone for densification in a continuous operation as the spray drying is being carried out. A means for accomplishing densification in a continuous operation is illustrated in FIG. 3. Analogous to the system illustrated in FIG. 1 with like components designated as primes, non-fibrillatable fluoropolymer dispersion and, optionally, at least one other component, preferably aqueous dispersion, is introduced into spray dry chamber 5', but prior to exiting the chamber, powder particles are densified on an integrated internal fluidized bed 30. Densification is carried out by contacting the granules with heated gas to agitate the granules. In this illustration, air which has been heated by air heater 31 is supplied with the aid of supply fan 32 to the fluidized bed 30 through pipe 33. The temperature of the air supplied to the fluidized bed is in the range of from 428° F. (220° C.) to 563° F. (295° C.), depending on the melt viscosity of the fluoropolymer and particularly below the melting point of the fluoropolymer so as not to cause sintering of the particles. The heated gas acts to form a fluidized bed of the granules, in which the collision interaction between particles causes the densification and produces friable particles of non-fibrillatable fluoropolymer and, optionally, at least one other component having a density of at least 50 g/100 cc for this embodiment. Alternately the fluidized bed may be located external to the spray dry chamber and accomplish densification.

To achieve desired particle size and/or density for a particular application, two additional optional steps may be applied to the powder particles. After spray drying and/or densification, the step of heat treatment or the step of comminution or both may be used. Heat treatment is actually a means of further densification. Conventional tray drying methods using either a forced convection oven or combining forced convection with a hot plate (conduction) dryer are suitable as well as the use of heated gas to form fluidized beds as discussed above. Depending on the particular fluoropolymer, heat treatment is conducted for approximately 5 hours at temperatures of from 300–500° F. (149–260° C.), but in any event at times and/or temperatures insufficient to sinter the particles. The particles remain friable. Comminution is a means of reducing the particle size if desired and conventional methods of grinding are suitable.

Sprayable powders of this invention may be applied to substrates by conventional electrostatic spraying techniques such as triboelectric spraying or corona spraying. Surprisingly, the powders of this invention have improved fluidity and are capable of achieving higher film builds on substrates using these standard techniques. Multicomponent powders of this invention do not segregate during electrostatic application thereby providing more uniform coatings on substrates. By this it is meant that the coating produced by spraying the powder of this invention contains substantially equivalent concentrations of fluoropolymer component and other components, as compared to the bulk sprayable powder.

The difference in component concentrations between a coating produced by spraying the powder and the bulk sprayable powder is less than 20%, relative to the component concentrations of the sprayable powder, and preferably less than 10%. Further, the multicomponent products of this invention which do not adhere to a target substrate during electrostatic application, e.g., the overspray, are also directly recyclable because the components do not segregate during the spraying application.

Sprayable powders of this invention may be used as a single coating, or in a multilayer fluoropolymer coating system. Such coatings have application to cookware articles such as fry pans, sauce pans; rice cookers, grills, and bakeware as well as to numerous industrial applications such as fuser rolls or belts for copiers and printers, light bulbs or heating lamps, chemical processing reactors including, tanks, impellers, pipes, valves and chutes. Sprayable powders of this invention also have application in medical devices such as metered dose drug inhalers.

Fluoropolymers

Non-fibrillatable fluoropolymers used to make sprayable powders of the present invention include those fluoropolymers which have melt viscosities within the range of $1\times10^2$ Pa·s to $1\times10^6$ Pa·s determined at temperatures which are standard for the polymer. By non-fibrillatable is meant that the polymer does not tend to develop fibrils nor agglomerate when it is subjected to shear forces and that the polymer cannot be successfully extruded because the green strength is too low. Melt viscosities are determined by the measurement of melt flow rate in accordance with the procedure of ASTM D-1238 modified as set forth in Canadian patent 1,248,292 and converting the resultant melt flow rate to melt viscosity by the calculation given. The fluoropolymers include those which are melt-processible, as defined in the '292 patent and those which have melt flow but are not melt processible. An example of melt-flowable but not melt processible fluoropolymer is polytetrafluoroethylene which has the low melt viscosity described above, such low melt viscosity indicating low molecular weight, whereby, melt formed articles of such resin have no strength, i.e. will break upon handling.

Generally, melt-processible fluoropolymer resins useful in this invention have melt viscosity (MV) in the range of $0.5–50\times10^3$ Pa·s though viscosities outside this range can be used. More commonly, MV is in the range of $1–40\times10^3$ Pa·s. Such fluoropolymers include copolymers of TFE with one or more copolymerizable monomers chosen from perfluoroolefins having 3–8 carbon atoms and perfluoro(alkyl vinyl ethers) (PAVE) in which the linear or branched alkyl group contains 1–5 carbon atoms, with comonomer present in sufficient amount to reduce the melting point substantially below that of PTFE, e.g., to a melting point no greater than 31 5° C. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro(propyl vinyl ether) (PPVE). Additional fluoropolymers that can be used include copolymers (ETFE) of ethylene with TFE, optionally including minor amounts of one or more modifying comonomer such as perfluorobutyl ethylene (PFBE). Other hydrogen-containing fluoropolymers that can be used include copolymers (ECTFE) of ethylene and CTFE, and vinylidene fluoride homopolymers and copolymers.

Useful fluoropolymers also include those commonly known to produce micropowders. These fluoropolymers also generally have a melt viscosity $1\times10^2$ Pa·s to $\times10^6$ Pa·s at 372° C. Melt viscosities are determined by the measurement of melt flow rate in accordance with the procedure of ASTM D-1238 modified as set forth in Canadian patent 1,248,292 and converting the resultant melt flow rate to melt viscosity by the calculation given below. Such polymers include but are not limited to those based on the group of polymers known as tetrafluoroethylene (TFE) polymers. The polymers may be directly polymerized or based on degradation of higher molecular weight PTFE resins. TFE polymers include homopolymers of TFE (PTFE) and copolymers of TFE with such small concentrations of copolymerizable modifying comonomers (<1.0 mole percent) that the resins remain non-melt-processible (modified PTFE). The modifying monomer can be, for example, hexafluoropropylene (HFP), perfluoro(propyl vinyl) ether (PPVE), perfluorobutyl ethylene, chlorotrifluoroethylene, or other monomer that introduces side groups into the molecule.

The PTFE resins of this invention include both those derived from suspension polymerization and from emulsion polymerization. High molecular weight PTFE as used for micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE of suitable viscosity by appropriate control of molecular weight in the emulsion polymerization process such as by the method described in U.S. Pat. No. 3,956,000 (Kuhls et al).

Specific examples of non-fibrillatable fluoropolymers that may be used in this invention include perfluoroalkoxy (PFA) fluorinated ethylene propylene (FEP), low molecular weight polytetrafluoroethylene, polyvinylidene fluoride (PVDF), ethylene/tetrafluoroethylene copolymer (ETFE), and ethylene/chlorotrifluoroethylene (ECTFE) copolymer.

The fluoropolymer component is generally commercially available as a dispersion of the polymer in water, which is the preferred form for the, composition of the invention for ease of application and environmental acceptability. By "dispersion" is meant that the fluoropolymer particles are stably dispersed in the aqueous medium, so that settling of the particles does not occur within the time when the dispersion will be used; this is achieved by the small size of the fluoropolymer particles (also referred to as primary particles), typically on the order of 0.2 micrometers, and the use of surfactant in the aqueous dispersion by the dispersion, manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In which case, typically an organic liquid is used in order to achieve an intimate mixture of fluoropolymer and if desired, high temperature resistant polymer binder. The organic liquid is not a halocarbon liquid. The organic liquid may be chosen because a desired binder dissolves in that particular liquid. If the binder is not dissolved within the liquid, then the binder can be finely divided and be dispersed with the fluoropolymer in the liquid. The resultant composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, mixtures thereof, among others. The amount of the organic liquid will depend on the flow characteristics desired for the particular coating operation.

Other Components

Sprayable powder of the present invention may contain in addition to fluoropolymer, a high temperature resistant polymer binder. The binder component comprises a polymer that is film-forming upon heating to fusion, is thermally stable, and has a sustained temperature use of at least about 140° C. A binder is well known for use in nonstick finishes for adhering fluoropolymer to substrates, and for film-forming. The binder is generally non-fluorine containing and yet adheres to fluoropolymer. Examples of such polymers include one or more: (1) polysulfones, which are amorphous thermoplastic polymers with a glass transition temperature of about 185° C. and a sustained service temperature of about 140° C. to 160° C., (2) polyethersulfones (PES), which are amorphous therm oplastic polymers with a glass transition temperature of about 230° C. and a sustained temperature service of about 170° C. to 190° C., (3) polyphenylene sulfides (PPS), which are partially crystalline polymers with a melting temperature of about 280° C. and a sustained temperature service of about 200° C. to 240° C., (4) polyimides, polyamide imides (PAI), and/or polyamic acid salt which converts to polyamide imide, which imides crosslink upon heating of the coating to fuse it and which have a sustained service temperature in excess of 250° C., among others. All of these polymers are thermally stable and dimensionally stable at temperatures within their sustained service range and below, and they are wear resistant. These polymers also adhere well to clean metal surfaces.

In addition to the fluoropolymer, component sprayable powders may contain inorganic fillers, film hardeners, pigments, stabilizers and other additives. Such additives may be added directly to the fluoropolymer dispersion prior to spray drying. Or a liquid dispersion of the additive can be mixed with the fluoropolymer dispersion or pumped to the drying chamber as a separate dispersion. Examples of suitable fillers include inorganic oxides, nitrides, borides and carbides of zirconium, tantalum, titanium, tungsten, boron, and aluminum as well as glass flake, glass bead, glass fiber, aluminum or zirconium silicate, mica, metal flake, metal fiber, fine ceramic powders, silicon dioxide, titanium dioxide, barium sulfate, talc, carbon black, etc. and synthetic fibers of polyamides, polyesters, and polyimides.

EXAMPLES

Unless otherwise stated in the following examples, solution concentrations are in wt % based on the combined weights of solute and solvent.

The solids content of fluoropolymer dispersions were determined gravimetrically, and are stated in wt % based on the combined weights of solids and liquid.

Fluoropolymers

PFA-1 dispersion—TFE/PPVE fluoropolymer resin dispersion in water with a solids content of from 33–37 wt. % and raw dispersion particle size (RDPS) of from 150–250 nanometers, the resin having a PPVE content of from 3.5–4.6wt. % and a melt flow rate of from 9.7–17.7 measured at 372° C. by the method of ASTM D-1238 modified as described in Canadian patent 1,248,292. MFR is related to melt viscosity (Mv) by the relationship MV=53.15/MFR, when MFR is in units of g/10 min and MV is in units of 103 Pa·s.

PFA-2 dispersion—TFE/PPVE fluoropolymer resin dispersion in water with a solids content of from 33–37 wt. % and RDPS of from 150–250 nanometers, the resin having a PPVE content of from 3.0–3.8 wt. % and a melt flow rate of from 5.1–6.6 measured at 372° C. by the method of ASTM D-1238 modified as described in Canadian patent 1,248,292.

PFA-3 dispersion—TFE/PPVE fluoropolymer resin dispersion in water with a solids content of from 33–37 wt. % and RDPS of from 150–250 nanometers, the resin having a PPVE content of from 2.9–3.6 wt. % and a melt flow rate of from 1.3–2.7 measured at 372° C. by the method of ASTM D-1238 modified as described in Canadian patent 1,248,292.

FEP-1 dispersion—TFE/HFP fluoropolymer resin dispersion in water with a solids content of from 33–39 wt. % and RDPS of from 150–210 nanometers, the resin having an HFP content of from 10.4–12.4 wt. % and a melt flow rate of from 0.3–1.2 measured at 372° C. by the method of ASTM D-1238 modified as described in Canadian patent 1,248,292.

FEP-2 dispersion—TFE/HFP fluoropolymer resin dispersion in water with a solids content of from 33–39 wt. % and RDPS of from 150–210 nanometers, the resin having an HFP content of from 10.3–13.2 wt. % and a melt flow rate of from 2.95–13.3 measured at 372° C. by the method of ASTM D-1238 modified as described in Canadian patent 1,248,292.

PTFE dispersion—TFE fluoropolymer resin dispersion in water with a solids content of 30–60 wt %, standard specific gravity (SSG 2.2) measured according to ASTM D4895 and RDPS of from 0.17–0.21 micrometers.

Micropowder dispersion—TFE fluoropolymer resin dispersion in water with a solids content of 30–35 wt %, a melt flow rate of from 9–24 and raw dispersion particle size (RDPS) of from 0.17–0.21 micrometers.

Other Components

A1—Calcined aluminum oxide dispersion, particle size 2.7–3.7 micrometers, available from Baystate Abrasives.

A2 Aluminum oxide dispersion, particle size 0.3–0.5 micrometers, available from Alcoa.

Graphite dispersion, average particle size 0.4 micrometers, available from Acheson Colloids.

Titanium dioxide, average particle size <2 micrometers, available as TI-PURE® R-961 from The DuPont Company.

Silicon carbide, average particle size up to 4.0 micrometers (max.), available from Fujimi Corporation.

Ultramarine Blue pigment dispersion, particle size <44 micrometers, available from Akzo Nobel Chemicals, Inc.

Tin, particle size <44 micrometers, available from Reade Advance Materials.

Mica coated with iron oxide (red), particle size 10–60 micrometers, available from EM Industries.

Polyether sulfone available from BASF Polyamide imide—a 36 wt % solution of PAI resin in an NMP-based solvent containing naptha and butyl alcohol in ratio NMP/naptha/alcohol=40.5/21.5/2.0 (grade PD-10629, Phelps-Dodge Magnet Wire Co.).

Average particle size of powder particles was measured by laser light scattering on dry particles, (using the Microtrac 101 Laser Particle,Counter, available from Leeds & Northrup, a division of Honeywell Corporation).

Bulk density is determined by using a clean, pre-weighed 100 ml glass graduated cylinder. Dry powder is poured into the cylinder and leveled at 100 ml level and weighed. Bulk density is reported in g per 100 cc.

Specific surface area (SSA) is determined using the procedures described in ASTM D 4567, except a 20 minute degas period at 200° C. is used instead of 60 minutes at 300° C. Generally, higher SSA indicates smaller fundamental particle size.

Examples 1–8

Preparation of Sprayable Powder from Aqueous Dispersion,

Sprayable powder is prepared by feeding, in accordance with, the eight different compositions enumerated in Table 1, aqueous dispersion of fluoropolymer and as designated additional components to a spray dryer, which is shown in FIG. 1. For Examples 1–7, the spray dryer used is model 69, available from APV Americas, Inc., Tonawanda, N.Y. For Example 8, the spray dryer is a laboratory model, type PSD-52 also available from APV. The aqueous dispersion passes through. the centrifugal atomizer at the top of chamber into a hot air envelope where the dispersion is rapidly vaporized into primary particles that begin to agglomerate and dry during their descent through the chamber. Specific process conditions are listed in Table 1 including air temperature at the inlet to the chamber and at the outlet of the chamber, rotating speed of the atomizer and air flow through the chamber. Powder particles having bulk densities in the range of from 21–28 g/100 cc are separated from a gas stream of water vapor and air in a baghouse and collected for further processing. Characteristics of the spray dried powder for each of the eight compositions are listed in Table 1.

Powder particles for Examples 1–7 from the spray dryer are further densified by mechanical compaction. The particles are fed to a roll compactor, model IR 520 Chilsonator®, supplied by The Fitzpatrick Company, Elrhurst Ill. as schematically illustrated in FIG. 2. The roll compactor is equipped with a rotary cutter blade which acts to reduce the size of polymer pellets exiting the compaction rolls producing powder particles having a density in the range of 80–101 g/100 cc which are passed through a sizing mill screen. Characteristics of the densified powder for each of the seven compositions are listed in Table 2.

Densified powder particles of Examples 1–7 are further reduced in size by grinding in a Air Classifier Mill (ACM 30 or ACM 10 or ACM 2 as noted), available from Hosokawa Micron Powder Systems, Summit, N.J. The process of spray drying, densification:and grinding as described produces sprayable powder of non-fibrillatable fluoropolymer having friable granules of agglomerated primary particles, being free of halocarbon liquid, having a bulk density of 54–88 g/100 cc, and an average particle size of 29–39 micrometers. Characteristics of the ground powder for each of the seven compositions are listed in Ta61e 3.

Examples 1–3 illustrate sprayable, clear fluoropolymer powder of a single fluoropolymer component. Example 4 illustrates sprayable fluoropolymer powder that is a uniform blend of two fluoropolymer components. Example 5 illustrates sprayable fluoropolymer powder that is a uniform blend of fluoropolymer with a $TiO_2$ pigment to produce a pigmented composition. Example 6 illustrates sprayable fluoropolymer powder that is a uniform blend of fluoropolymer with an inorganic filler of silicon carbide. Example 7 illustrates sprayable fluoropolymer powder that is a uniform blend of fluoropolymer with an inorganic filler of graphite. Example 8 illustrates sprayable fluoropolymer powder that is a uniform blend of fluoropolymer with the thermal stabilizer tin, which can be used after spray drying without further processing having a bulk density of 21 g/100 cc and an average particle size of 25 micrometers.

Micrographs, FIGS. 4a and 4b are provided for the sprayable powder produced in Example 2. The particles are shown after spray drying, densification and grinding. The powder has a SSA of 5.22.

The non-segregatable nature of the .sprayable fluoropolymer blends produced in Examples 5–8 is demonstrated by comparing them to standard mechanically blended polymers. Commercial PFA powder made according to the solvent aided coagulation process of Canadian patent 1,248, 292 using PFA-1 dispersion and without the fluorination step is mechanically mixed providing four samples, one sample having 2.5 wt % TiO2, one sample having 8 wt % SiC, one sample having 8 wt % graphite, and one sample having 1 wt % tin. The mechanically blended products are made using large mechanical mixers/tumblers to physically mix the PFA and the added component with the aid of 0.4 wt % fumed silica (added only with $TiO_2$ formulation).

Powders made according to Example 5–8, as well as the four samples made by mechanically blending are each poured into a 100 ml graduated cylinder up to the 50 ml level. Each sample is then poured into separate sample jars where 100 ml of water is added to each one. Each sample jar is sealed and each jar is shaken vigorously until all the particle clumps are dispersed. Each sample is then poured into separate 250 ml graduated cylinders and allowed to stand. After 10 minutes, the following parameters are observed: (1) the level of separated components and (2) the clearness or cloudiness of the aqueous phase. From this test it is observed that components from the samples prepared from commercial powders separate into distinct layers. In contrast, the sprayable powders of Example 5–8 are non-segregatable, i.e., there is little or no separation of the added component (e.g., pigment, filler or stabilizer) from the fluoropolymer component. The pigment, filler, and stabilizer are each respectively encapsulated in (or intimately enmeshed with) the fluoropolymer particles and do not tend to separate. The aqueous phase of Examples 5–8 tends to be clear.

TABLE 1

Water based, spray drying

| | Ex. 1 | Ex. 2 | Ex. 3 |
|---|---|---|---|
| Dispersion Grade | PFA-1 | PFA-2 | PFA-3 |
| % Weight Total Solids | 35 | 35 | 35 |
| Spray Dryer Process Conditions | | | |
| Inlet Air Temp, F. (C.) | 850(454) | 850(454) | 850(454) |
| Outlet Air Temp, F. (C.) | 320(160) | 320(160) | 320(160) |
| Air Flow, CFM (CMM) | 3281(93) | 3281(93) | 3281(93) |
| Atomizer Speed, RPM | 7425 | 7425 | 7425 |
| Powder Bulk Density Grams/100 cc | 26 | 27 | 28 |

| | Ex. 4 | Ex. 5 | Ex. 6 |
|---|---|---|---|
| Dispersion Blends | 50% PFA-3 + 50% FEP-1 | PFA-1 + 3% $TiO_2$ (Pigment) | PFA-1 + 8% SiC (Filler) |
| Component #1 | 100 g PFA-3 | 100 g PFA-1 | 100 g PFA-1 |
| Component #2 | 97 g FEP-1 | 1.05 g $TiO_2$ | 3.04 g SiC |
| % Weight Total Solids | 35.5% | 35.7% | 36.9% |
| Spray Dryer Process Conditions | | | |
| Inlet Air Temp, F. (C.) | 850(454) | 850(454) | 850(454) |
| Outlet Air Temp, F. (C.) | 320(160) | 320(160) | 320(160) |
| Air Flow, CFM (CMM) | 3281(93) | 3281(93) | 3281(93) |
| Atomizer Speed, RPM | 7425 | 7425 | 7425 |
| Powder Bulk Density Grams/100 cc | 28 | 28 | 27 |

| | Ex. 7 | Ex. 8 |
|---|---|---|
| Dispersion Blends | PFA-2 + 8% graphite | PFA-3 + 1% Sn |

TABLE 1-continued

Water based, spray drying

| | (Filler) | (Stabilizer) |
|---|---|---|
| Component #1 | 100 g PFA-2 | 100 g PFA-3 |
| Component #2 | 30.4 g Graphite Dispersion | 0.30 g Sn |
| % Weight Total Solids | 29.2% | 30.2% |
| Spray Dryer Process Conditions | | |
| Inlet Air Temp, F. (C.) | 850(454) | 850(454) |
| Outlet Air Temp, F. (C.) | 320(160) | 250(121) |
| Air Flow, CFM (CMM) | 3281(93) | 74(2) |
| Atomizer Speed, RPM | 7425 | 48,000 |
| Powder Bulk Density Grams/100 cc | 24 | 21 |

*Ex. 8 APV Lab Dryer Type PSD-52, all others APV model 69

TABLE 2

Water Based, Compaction/Densification of Spray Dried Powder

| | Ex. 1 | Ex. 2 | Ex. 3 |
|---|---|---|---|
| Powder Grade | PFA-1 | PFA-2 | PFA-3 |
| Compaction/Densification Process Conditions | | | |
| Roll Pressure, Psig (Mpa) | 1100 (7.6) | 650 (4.5) | 1100 (6.9) |
| Deaeration Vacuum Pressure, in of Hg at room temperature | 15 | 12 | 15 |
| Mill Screen Size, Mils | 156 | 125 | 200 |
| Granular Bulk Density Grams/100 cc | 98 | 96 | 101 |

| | Ex.4 | Ex. 5 | Ex. 6 |
|---|---|---|---|
| Powder Blends | 50% PFA-3 + 50% FEP-1 | PFA-1 + 3% $TiO_2$ (Pigment) | PFA-1 + 8% SiC (Filler) |
| Compaction/Densification Process Conditions | | | |
| Roll Pressure, Psig (Mpa) | 1200 (8.3) | 650(4.5) | 650(45) |
| Deaeration Vacuum Pressure, in of Hg at room temperature | 0 | 15 | 7 |
| Mill Screen Size, Mils | 200 | 187 | 187 |
| Granular Bulk Density Grams/100 cc | 80 | 97 | 99 |

| | Ex. 7 | Ex. 8 |
|---|---|---|
| Powder Blends | PFA-2 + 8% graphite (Filler) | PFA-3 + 1% Sn (Stabilizer) |
| Compaction/Densification Process Conditions | | — |
| Roll Pressure, Psig (Mpa) | 650(4.5) | — |
| Deaeration Vacuum Pressure, in of Hg at room temperature | 14 | — |
| Mill Screen Size, Mils | 187 | — |
| Granular Bulk Density Grams/100 cc | 91 | — |

TABLE 3

Water based, Grinding of Densified Material to Powder Particles

|  | Ex. 1 | Ex. 2 | Ex. 3 |
|---|---|---|---|
| Granular Grade | PFA-1 | PFA-2 | PFA-3 |
| Grinding Parameter Air Classifier Machine Speed, RPM | 700 | 750 | 700 |
| Finished Product Powder Bulk Density Grams/100 cc | 77 | 75 | 80 |
| Average Particle Size Micrometers | 29 | 34 | 35 |

|  | Ex. 4 | Ex. 5 | Ex. 6 |
|---|---|---|---|
| Granular Blends | 50% PFA-3 + 50% FEP-1 | PFA-1 + 3% $TiO_2$ (Pigment) | PFA-1 + 8% SiC (Filler) |
| Grinding Parameter Air Classifier Machine Speed, RPM | 1150* | 950** | 1050** |
| Finished Product Powder Bulk Density Grams/100 cc | 54 | 80 | 88 |
| Average Particle Size Micrometers | 36 | 37 | 39 |
| Water Separation | — | No | No |

|  | Ex. 7 | Ex. 8 |
|---|---|---|
| Granular Blends | PFA-2 + 8% graphite (Filler) | PFA-3 + 1% Sn (Stabilizer) |
| Grinding Parameter Air Classifier Machine Speed, RPM | 1800*** | — |
| Finished Product Powder Bulk Density Grams/100 cc | 70 | — |
| Average Particle Size Micrometers | 39 | — |
| Water Separation | No | No |

*ACM30, ACM10, *ACM2

Examples 9 and 10

Uniform Sprayable Fluoropolymer Blends

Uniform blends of sprayable fluoropolymer are made and subjected to analysis to quantify the non-segregatable nature of these blends. Example 9 is prepared using procedures similar to those described in Examples 1–7, i.e., spray dried, mechanically compacted and comminuted. Example 9 is a blend is a sprayable fluoropolymer powder of PFA-3 having about 7 wt % $Al_2O_3$ Example 10 is prepared according to the procedure described for Example 8, i.e., spray dried without further densification and comminution. Example 10 is a sprayable fluoropolymer powder of PFA-3 intimately combined with 5 wt % $Al_2O_3$ and 3 wt % mica (also having 1% amino silane based on the weight of the mica).

Compositions and specific process conditions for Examples 9 and 10 are listed in Tables 4–6.

The non-segregation of the components of the sprayable fluoropolymer blends produced in Examples 9 and 10 is demonstrated by comparing them to standard mechanically blended polymers. Commercial PFA powder made according to the solvent aided coagulation process of Canadian patent 1,248,292 using PFA- 3 dispersion and without the fluorination step was mechanically mixed providing two samples: one sample having 10 wt % $Al_2O_3$ and one sample having 3 wt % $Al_2O_3$ and 5 wt % mica (also having 1% amino silane based on the weight of the mica). The mechanically blended products are made using large mechanical mixers/tumblers to physically mix the PFA and the added components.

Powders made according to Example 9 and 10, as well as the two samples made by mechanically blending are applied to aluminum panels by use of a corona spray gun, model Versa-Spray II, available from Nordson Corp., Amherst, Ohio, with a spray gun voltage of 40 kV and a powder feed pressure of 15 psig.: Powders are applied to smooth clean surfaces at a distance of 12–14 inches (30–36 cm).

Bulk powder, powder from the panel and overspray powder from the floor are collected and subjected to Compositional Analysis by Thermogravimetry (TGA) according to ASTM El 131–98 to determine the inorganic content (amount of filler/pigment) in each sample. All of the fluoropolymer in the powder samples is volatized and only inorganic materials remain. The results are reported in Table 7. The coating on the panel produced by the sprayable powders from Example 9 contains substantially equivalent component concentrations of the fluoropolymer and the added components as the bulk sprayable powder. In this example, the difference in the minor component concentrations between a coating produced by spraying and the bulk sprayable powder for Example9 is 4% relative to-the minor component concentrations of the sprayable bulk powder. The powder made by the process described in Example 9 is a uniform blend that can be uniformly applied to a target panel. This is in direct contrast to the mechanically blended powders wherein the minor component concentration difference for the dry blended sample is approximately 80%. Eighty percent of the aluminum oxide present in the dry blended sprayable powder separates from the fluoropolymer and never hits the target panel.

Further, it is observed that the difference in component concentrations between the overspray (as represented by the floor samples) for Example 9 is 7% relative to the minor component concentrations of the sprayable bulk powder. The overspray powder made by the process described in Example 9 can be directly recycled because the components have not segregated during the electrostatic spraying application. This is in direct contrast to the mechanically blended powders wherein the minor component concentration difference between the overspray and the sprayable bulk powder for the dry blended sample is approximately 50%, and which cannot be directly recycled due to the necessity of reformulating the sprayable powders to their original concentration.

The TGA analysis of Example 10 does not return the fully expected 8 weight %. Approximately 2 weight % of the inorganic is apparently volatized consistently with all samples. This not uncommon. Fluoropolymers decompose to very reactive species such as hydrogen fluoride. Hydrogen fluoride can react with inorganic materials, sometimes forming volatile fluorine-containing inorganics.

The coating on the panel produced by the sprayable powders from Examples 10 (discounting the consistent 2% loss) contains substantially equivalent component concentrations of the fluoropolymer and the added components as the bulk sprayable powder. In this example, there is essentially no difference in the minor component concentrations between a coating produced by spraying and the bulk sprayable powder for Example 10 relative to the minor component concentrations of the sprayable bulk powder.

The powder made by the process described in Example 10 is a uniform blend that can be uniformly applied to a target panel. This is in direct contrast to the mechanically blended powders wherein the minor component concentration difference for the dry blended sample is approximately 33%. One third of the inorganic oxide in the dry blended sprayable powder separates from the fluoropolymer and never hits the target panel.

Further, it is observed that there is essentially no difference in component concentrations between the overspray (as represented by the floor sample) for Example 10 relative to the minor component concentrations of the sprayable bulk powder. The overspray powder made by the process described in Example 10 can be directly recycled because the components have not segregated during the electrostatic spraying application. This is in direct contrast to the mechanically blended powders wherein the samples undergo a separation related to the charging process, with much of the inorganic components separated. The minor component concentration difference between the overspray and the sprayable bulk powder for the dry blended sample is approximately 66%. Powders made by dry blending cannot be directly recycled due to the necessity of reformulating the sprayable powders to their original concentration.

The samples are also subjected to the water separation test described for Examples 5–8. Examples 9 and 10 show little or no separation where the mechanically blended samples separate into distinct layers.

TABLE 4

Spray Drying Fluoropolymer Blends

| | Ex. 9 | Ex. 10 |
|---|---|---|
| Dispersion Blends | PFA-3 + 7% Al$_2$O$_3$ (A1) | PFA-3 + 5% Mica + 3% Al$_2$O$_3$ (A2) |
| Component #1 | 100 g PFA-3 | 100 g PFA-3 |
| Component #2 | 2.26 g Al$_2$O$_3$ | 1.63 g Mica |
| Component #3 | | 0.98 g Al$_2$O$_3$ |
| % Weight Total Solids | 29.6% | 31.8% |
| Spray Dryer Process Conditions* | | |
| Inlet Air Temp, F. (C.) | 850(454) | 850(454) |
| Outlet Air Temp, F. (C.) | 320(160) | 250(121) |
| Air Flow, CFM (CMM) | 3281(93) | 74(2) |
| Atomizer Speed, RPM | 7425 | 48,000 |
| Powder Bulk Density Grams/100 cc | 28 | 21 |

*Ex. 9 APV model 69, Ex. 10 APV Lab Dryer Type PSD-52

TABLE 5

Compaction/Densification of Spray Dried Blended Powder

| | Ex. 9 | Ex. 10 |
|---|---|---|
| Powder Blends | PFA-3 + 7% Al$_2$O$_3$ (A1) | PFA-3 + 5% Mica + 3% Al$_2$O$_3$ (A2) |
| Compaction/Densification Process Conditions | | |
| Roll Pressure, Psig (Mpa) | 650(4.5) | — |
| Deaeration Vacuum Pressure, in of Hg at room temperature | 15 | — |
| Mill Screen Size, Mils | 187 | — |
| Granular Bulk Density Grams/100 cc | 99 | — |

TABLE 6

Grinding of Densified Material to Blended Powder Particles

| | Ex. 9 | Ex. 10 |
|---|---|---|
| Granular Blends | PFA-3 + 7% Al$_2$O$_3$ (A1) | PFA-3 + 5% Mica + 3% Al$_2$O$_3$ (A2) |
| Grinding Parameter Air Classifier Machine Speed, RPM | 2000* | — |
| Finished Product Powder Bulk Density Grams/100 cc | 73 | — |
| Average Particle Size Micrometers | 28 | — |

*ACM2

TABLE 7

Thermogravimetric Analysis of Blended Powders

| | Ex. 9 PFA-3 + 7% Al$_2$O$_3$ (A1) wt % | Dry Blend PFA-3 + 10% Al$_2$O$_3$ (A1) wt % | Ex. 10 PFA-3 + 5% Mica + 3% Al$_2$O$_3$ (A2) wt % | Dry Blend PFA-3 + 5% Mica + 3% Al$_2$O$_3$ (A2) wt % |
|---|---|---|---|---|
| Bulk Sample | 6.843% | 10.24% | 6.0% | 6.0% |
| Panel Sample | 6.561% | 2.004% | 6.3% | 4.0% |
| Floor Sample | 6.345% | 5.081% | 6.2% | 2.0% |
| Water Separation | No | Yes | No | Yes |

Example 11

Powder Application

Sprayable powder of non-fibrillatable fluoropolymer made substantially according to the procedure described for Example 2 and having a bulk density of 75 g/100 cc and an average particle size of 34 micrometers is 10 prepared. The prepared powder is sprayed onto the exterior surface of a series of heat lamps by use of a corona spray gun, model Versa-Spray II, available from Nordson Corp., Amherst, OH, with a spray gun voltage of 62 kV and a powder feed pressure of 15 psig. The lamps are sprayed until electrical repulsion is experienced (i.e., additional coating does not adhere) and then baked. In some cases lamps were sprayed, baked and subsequently resprayed and baked. Lamps with coating thicknesses ranging from 4.0–7.5 mils (102–191 micrometers) are produced. Baking is at a temperature of 800° F. (425° C.) for. from 5.0 to 6.5 minutes to fuse the powder into a continuous, thin, transparent fluoropolymer coating. The coated lamps are then dropped from a height of 5 feet (1.5 meters) to test the coherence of the coating upon lamp shattering. Lamps prepared according to this invention produce a coherent coating that contains shards of broken glass within the coating casing.

When comparing the heat lamp coated with powder of this invention to a lamp coated with commercially prepared fluoropolymer, as described in Canadian patent 1,248,292, the coating of this invention is found to be surprisingly more transparent and thereby more effective in transmitting heat to items such as prepared hot food awaiting serving to/consumption by customers, for example in a restaurant, while still providing a protective coating in case of breakage. Further in application, the powders of this invention have improved fluidity and are capable of achieving higher film builds.

Example 12, 13

Effect of Heat Treatment

Two products of sprayable powder of non-fibrillatable fluoropolymer are prepared, with properties and processing conditions as outlined in Table 8. In Example.12, a fluoropolymer dispersion is spray dried, densified by mechanical compaction and ground substantially as described in Example 2. In Example 13, the same procedure is followed with however, the additional step of heat treating the granular material after the densification step but before grinding. Heat treatment is carried out by placing powder on an oven tray and heating at temperatures of approximately 500° F. (260° C.) (well below the melting point of the fluoropolymer) for approximately 5 hours. Characteristics for the non-heat treated powder of Example 12 and the heat treated powder of Example 13 are listed in Table 8. Heat treatment provides a means for increasing the density of sprayable powders if so desired for certain applications and for obtaining powders that can be better controlled in the grinding operation to obtain a desired average particle size. The heat treatment however is conducted at temperatures more than 25 degrees C. below the melting temperature so as not to produce particles that are sintered or heat hardened and which would be undesirable in certain spraying operations.

TABLE 8

Effect of Heat Treatment on Bulk Density

|  | Ex. 12 PFA-2 | Ex. 13 PFA-2 |
| --- | --- | --- |
| Granular Before Heat Treatment Bulk Density, Grams/100 cc | 98 | 98 |
| Heat Treatment Conditions |  |  |
| Temperature, Deg. F., (C.) | None | 500(260) |
| Duration, Hours | None | 5 |
| Granular After Heat Treatment Bulk Density, Grams/100 cc | 98 | 100 |
| Grinding Parameter Air Classifier Machine Speed, RPM | 750 | 800 |
| Finished Product Powder Bulk Density Grams/100 cc | 63 | 74 |
| Average Particle Size Micrometers | 23 | 37 |

Examples 14, 15

Preparation of Sprayable Powder from Solvent Dispersion

Sprayable powder is prepared by feeding, in accordance with the two different compositions enumerated in Table 9, a dispersion of fluoropolymer, water miscible organic solvent (including water in Example 15) and, as designated, additional components to a spray dryer, a schematic of which is shown in FIG. 1, with the exception that hot nitrogen gas is used in place of hot air and that a closed loop system for recycling nitrogen and recovering solvent/water vapor is employed. The solvent dispersion passes through the centrifugal atomizer at the top of chamber into a-hot nitrogen gas envelope where-the dispersion is rapidly vaporized into primary particles that begin to agglomerate and dry during their descent through the chamber. Specific process conditions are listed in Table 9 including nitrogen gas temperature at the inlet to the chamber and at the outlet of the chamber, rotating speed of the atomizer and nitrogen flow through the chamber. Powder particles having bulk densities in the range of 38–40 g/100 cc are separated from a gas stream of solvent vapor and gas in a baghouse and collected for further processing. Characteristics of the spray dried powder for each of the two compositions are listed in Table 9. The friable powder particles from the spray dryer do not require further densification, heat treatment nor comminution to be useful as a primer composition for a metal substrate. Example 14 illustrates sprayable fluoropolymer powder that is a uniform blend of fluoropolymer component and binder (polyethersulfone). Example 15 illustrates the production of sprayable blue fluoropolymer powder that is a uniform blend of fluoropolymer, blue pigment and binder (polyamide imide).

The sprayable powder of Example 15 is electrostatically applied to cleaned and grit-blasted carbon steel substrate as a primer layer. A standard fluoropolymer topcoat is applied and the coated substrate is subjected to standard adhesion tests for cookware such as post boiling water adhesion, nail adhesion and cross-hatch tape adhesion. The coated substrate exhibits acceptable adhesion.

TABLE 9

Solvent Based Spray Drying

|  | Ex 14 White Primer | Ex. 15 Blue Primer |
| --- | --- | --- |
| Dispersion Composition |  |  |
| N-Methyl Pyrrolidone, % Wt. | 80.00 | 78.00 |
| PFA-1 Fluorocarbon Resin, % Wt. (% Solids) | 19.00 | 18.30 |
| Polyethersulfone, % Wt. | 1.00 | — |
| Sodium Aluminum Sulpho-Silicate, % Wt. | — | 2.06 |
| Demineralized Water, % Wt. | — | 0.70 |
| Amide Imide Polymer, % Wt. | — | 0.64 |
| Spray Dryer Process Conditions |  |  |
| Inlet Nitrogen Temp, F. (C.) | 372(189) | 331(166) |
| Outlet Nitrogen Temp, F. (C.) | 297(147) | 271(133) |
| Nitrogen Flow, CFM (CMM) | 500(14) | 500(14) |
| Temperature After Condenser, F. (C.) | 75(23) | 77(25) |
| Feed Product Temperature, F. (C.) | 61(16) | 59(15) |
| Atomizer Wheel Speed, RPM | 25000 | 25000 |
| Finished Product Powder Primer Bulk Density, Grams/100 cc | 40 | 38 |
| Average Particle Size, Micrometers | 31 | 16 |
| Color of Powder Primer | White | Blue |

Example 16

Comparative Example

An aqueous dispersion (60% solids) of PTFE is fed to a spray dryer, model PSD-52, available from APV Americas, Inc., Tonawanda, N.Y. (a schematic of which is shown in FIG. 1) substantially as described in Example 1, except that the dispersion and compressed air enter through the side of the chamber through a two-fluid nozzle instead of through a centrifugal atomizer at the top of the chamber. The following are the process conditions used:

Inlet Air Temperature: 250° C.

Outlet Air Temperature: 114° C.

Two-Fluid Nozzle Pressure: 20–30 psig

Air Flow: 74 CFM, (2.1 CMM)

The product recovered from the spray dryer is a dry, soft, fibrous product having fiber strands of about twelve inches or longer. The PTFE dispersion fed to the spray dryer in this example has a melt viscosity exceeding $1 \times 10^6$ Pa·s and therefore produces product that is fibrillatable and not the non-fibrillatable sprayable powder of this invention.

Example 17

Preparation of Sprayable Micropowder Blend from Aqueous Dispersion

An aqueous dispersion of 30% PFA-1 plus 34% FEP-2 plus 36% of Micropowder is fed to a spray dryer, model PSD-52, available from APV Americas, Inc., Tonawanda, NY a schematic of which is shown in FIG. 1 substantially as described in Example 1, except that the dispersion and compressed air enter through the side of the chamber through a two-fluid nozzle instead of through a centrifugal atomizer at the top of the chamber. The following are the process conditions used:

Inlet Air Temperature: 308° C.

Outlet Air Temperature: 131° C.

Two Fluid Nozzle Pressure: 22 psig

Air Flow: 78 CFM, (2.2 CMM)

Powder particles having a bulk density of 48 g/100 cc and a particle size of 22 micrometers are collected for application to substrate materials.

The example shows in direct contrast to Comparative Example 10 how melt-flowable, low molecular weight PTFE micropowder resins have applicability in the spray drying process of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Dry sprayable powder comprising friable granules of agglomerated primary particles of non-fibrillatable fluoropolymer and at least one other component, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s.

2. Dry sprayable powder comprising friable granules of agglomerated primary particles of a first non-fibrillatable fluoropolymer and at least one other non-fibrillatable fluoropolymer, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s.

3. The sprayable powder of claim 1 or 2 wherein the sprayable powder is free of water immiscible liquid.

4. The sprayable powder of claim 1 or 2 wherein the sprayable powder is free of halocarbon liquid.

5. The sprayable powder of claim 1 or 2 which has a bulk density of at least 35 g/100 cc.

6. The sprayable powder of claim 1 or 2 which has an average particle size of from 10 to 80 micrometers.

7. The sprayable powder of claim 1 or 2 wherein said granules are uncomminuted.

8. The sprayable powder of claim 1 wherein said granules comprise a plurality of fluoropolymers.

9. The sprayable powder of claim 1 wherein said other component is pigment.

10. The sprayable powder of claim 1 wherein said other component is inorganic filler.

11. A process for preparing a sprayable powder comprising spray drying a liquid dispersion of primary particles of non-fibrillatable fluoropolymer and at least one other component to obtain sprayable friable granules combining said fluoropolymer with said other component.

12. A process for preparing a sprayable powder by forming a mixture of a liquid dispersion of non-fibrillatable fluoropolymer and a liquid dispersion of at least one other component, and spray drying said mixture of liquid dispersions to obtain sprayable friable granules combining said fluoropolymer with said other component.

13. A process for preparing a sprayable powder by forming a mixture of a liquid dispersion of a first non-fibrillatable fluoropolymer and a liquid dispersion of at least one other non-fibrillatable fluoropolymer, and spray drying said mixture of liquid dispersions to obtain sprayable friable granules combining said fluoropolymer with said other component.

14. The process of claim 11 wherein said liquid dispersion has a total solids content of at least 5 weight %.

15. The process of claim 11 where said liquid dispersion has a total solids content of from 5–70 weight %.

16. The process of claim 11 or 13 wherein said liquid dispersion is free of water immiscible liquid.

17. The process of claim 11 or 13 wherein said liquid dispersion is free of halocarbon liquid.

18. The process of claim 11 or 13 wherein the liquid of at least one of said dispersions comprises a water miscible organic solvent and the friable granules have a bulk density of at least 20 g/100 cc and average particle size of 5 to 100 micrometers.

19. A process for preparing a sprayable powder of non-fibrillatable fluoropolymer comprising spray drying a liquid dispersion of primary particles of non-fibrillatable fluoropolymer and densifying the granules formed by spray drying to obtain sprayable friable granules.

20. The process of claim 11 wherein the liquid dispersion is aqueous and the granules formed by spray drying are further densified.

21. The process of claim 15 or 16 wherein after densification, the granules are comminuted.

22. The process of claim 17 wherein the friable granules have a bulk density of at least 50 g/100 cc and average particle size of 5 to 100 micrometers.

23. The process of claim 11 or 13 wherein said spray drying is carried out by atomizing said dispersion in the presence of heated gas below the melting point of said fluoropolymer.

24. The process of claim 15 or 16, wherein said densifying is carried out by mechanical compaction.

25. The process of claim 19 or 20, wherein said densifying is carried out by contacting said agglomerated primary particles with heated gas to form a fluidized bed of said particles.

26. The process of claim 19 or 20 wherein said densifying is carried out by forming a bed of said granules and agitating said bed in the presence of heated gas.

27. In the process for spray powder coating a substrate with powder of non-fibrillatable fluoropolymer and fusing said powder to form a uniform coating of said fluoropolymer on said substrate, the improvement comprising obtaining said powder by providing a liquid dispersion of primary particles of said fluoropolymer and at least one other component, spray drying said liquid dispersion to obtain agglomerated granules of said primary particles combined with said other component, and thereafter densifying said agglomerated particles to obtain as a result thereof friable granules having a bulk density of at least 20 g/100 cc and average particle size of 5 to 100 micrometers, said granules being said powder used in said powder coating.

28. The process of claim 27 wherein said liquid dispersion is free of water immiscible liquid.

29. Dry sprayable powder of non-fibrillatable fluoropolymer comprising a uniform, non-segregatable mixture of friable granules of agglomerated primary particles of said fluoropolymer and at least one other component, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s.

30. Dry sprayable powder of melt-processible fluoropolymer comprising a uniform, non-segregatable mixture of friable granules of agglomerated primary particles of said fluoropolymer and at least one other component, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s.

31. Dry sprayable powder of non-fibrillatable fluoropolymer comprising a uniform, non-segregatable mixture of friable granules of agglomerated primary particles of a first non-fibrillatable fluoropolymer and at least one other non-fibrillatable fluoropolymer, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s.

32. The sprayable powder according to claim 29, wherein a coating produced by spraying said powder contains component concentrations of said fluoropolymer and said at least one other component, which are less than 10% different from said component concentrations in said sprayable powder.

33. The sprayable powder according to claim 25, wherein the difference in component concentrations between a coating produced by spraying said powder and said sprayable powder is less than 20%, relative to the component concentrations of said sprayable powder.

34. The sprayable powder according to claim 25, wherein said particles of said at least one other component are encapsulated by said fluoropolymer.

35. The sprayable powder according to claim 25, wherein said at least one other component is aluminum oxide.

36. The sprayable powder according to claim 29, wherein said at least one other component comprises aluminum oxide and mica.

37. Sprayable powder according to claim 25, comprising 1 to 20 wt % of particles of said at least one other component in combination with said fluoropolymer, based on the total weight of fluoropolymer and said component.

38. Dry sprayable powder comprising friable granules of agglomerated primary particles of non-fibrillatable fluoropolymer and at least one other component, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s, said sprayable powder having a specific surface area (SSA) of 1–6 m$^2$/g.

39. Dry sprayable powder comprising friable granules of agglomerated primary particles of a first non-fibrillatable fluoropolymer and at least one other non-fibrillatable fluoropolymer, said granules having a bulk density of at least 20 g/100 cc and average particle size of 5 to 100 micrometers, the fluoropolymer present in said powder having a melt viscosity of $1 \times 10^2$ Pa·s to 1×106 Pa·s, said sprayable powder having a specific surface area (SSA) of 1–6 m$^2$/g.

40. Dry sprayable powder comprising friable granules of agglomerated primary particles of non-fibrillatable fluoropolymer and at least one other component, said granules having a bulk density of at least 20 g/100 cc and average particle size of 5 to 100 micrometers, the fluoropolymer present in said powder having a melt viscosity of $1 \times 10^2$ Pa·s to $1 \times 10^6$ Pa·s, said other component being a non-fluorine-contining polymer binder.

* * * * *